United States Patent [19]

Katakura

[11] Patent Number: 5,317,437
[45] Date of Patent: May 31, 1994

[54] DISPLAY APPARATUS WITH PIXELS HAVING SUBPIXEL REGIONS

[75] Inventor: Kazunori Katakura, Atsugi, Japan

[73] Assignee: Canon Kabushiki Kaisha, Tokyo, Japan

[21] Appl. No.: 916,611

[22] Filed: Jul. 22, 1992

[30] Foreign Application Priority Data

Jul. 25, 1991 [JP] Japan ................... 3-207273

[51] Int. Cl.5 ........................... G02F 1/1343
[52] U.S. Cl. ........................ 359/87; 359/54; 359/68
[58] Field of Search ........... 359/54, 87, 89, 68; 340/719, 784

[56] References Cited

U.S. PATENT DOCUMENTS 4,812,017 3/1989 Piper ..................... 359/54
4,828,365 5/1989 Stewart et al. ............ 359/68

FOREIGN PATENT DOCUMENTS 0271960 6/1988 European Pat. Off. .
0322106 6/1989 European Pat. Off. .
0361981 4/1990 European Pat. Off. .
0453033 10/1991 European Pat. Off. .

Primary Examiner—William L. Sikes
Assistant Examiner—Huy Mai
Attorney, Agent, or Firm—Fitzpatrick, Cella, Harper & Scinto

[57] ABSTRACT

A display apparatus has pixels arranged along rows and columns in which each pixel is defined by a pair of opposed electrodes. The pixels are provided by sub-pixels with color filters of different colors wherein integral light quantities of the same color sub-pixels of adjacent pixels are different. The display apparatus is capable of selecting a first display operation in which a single pixel is displayed as one display unit, as well as a second display operation in which at least two adjacent pixels are combined to form one display unit.

14 Claims, 10 Drawing Sheets

DISPLAY APPARATUS WITH PIXELS HAVING SUBPIXEL REGIONS

BACKGROUND OF THE INVENTION

1. Field of the Invention

The present invention relates to a display apparatus for displaying images and characters and, more particularly, to a matrix display apparatus which divides a pixel into sub-pixels to display multicolor and multi-gradation.

2. Related Background Art

Conventional matrix displaying apparatuses are capable of dividing a single pixel into sub-pixels so that multi-values are displayed using the pixel. As shown in FIG. 12, when the area of a single pixel is divided in a ratio of 3 to 2, the pixel is capable of displaying four values 0%, 40%, 60% and 100%. Also, when the area of a pixel is divided in a ratio of 1:1:1 and red, green and blue color filters are placed over the divided areas, eight colors can be displayed. When pixels are divided in an appropriate ratio, they are capable of displaying $2^N$ colors or $2^N$ gradations, where N is the number of pixels divided.

Because each pixel is divided into sub-pixels in the same ratio, when the above conventional apparatus displays a single piece of information using a plurality of pixels, there are a plurality of sub-pixels of the same color and gradation in a single display unit. Therefore, the number of gradations which can be displayed is much fewer than $2^N$. In other words, the conventional ratio at which a single pixel is divided into sub-pixels is inappropriate.

SUMMARY OF THE INVENTION

The present invention has been made to solve the problem of the above conventional display apparatus. The object of this invention is therefore to provide a display device capable of displaying more colors and gradations than in the conventional apparatus when a single piece of information is displayed using a plurality of pixels.

To achieve the above object, this invention provides a liquid crystal display apparatus comprising: pixels each having one sub-pixel or a plurality sub-pixels on a matrix electrode including scan electrodes and information electrodes, the area of one sub-pixel in one pixel being different from the area of another sub-pixel in an adjacent pixel.

The area of one pixel may be made different from that of an adjacent pixel, thus making it possible to make the area of one sub-pixel different from that of another. Alternatively, all pixels may have the same area, and the ratio of dividing one pixel into sub-pixels is made different from that of dividing another. This makes it possible to make the area of one sub-pixel different from that of another.

The display apparatus can be used as a color display apparatus by arranging color filters on the sub-pixels in each pixel. This invention may be applied to liquid crystal display apparatuses, particularly those having crystals, such as ferro-electric crystals, between the scan and information electrodes.

DESCRIPTION OF THE PREFERRED EMBODIMENTS

Pixels, each composed of one or more sub-pixels, are formed on a matrix electrode including scan and information electrodes. The area of one sub-pixel in one pixel is different from the area of another pixel in an adjacent pixel. The present invention is therefore capable of increasing the number of gradations displayed when a single piece of information is displayed using a plurality of pixels.

Embodiment 1 and Comparison Example 1

A description will be given of the first embodiment of this invention, in which the ratio at which one pixel is divided is made different from the ratio at which an adjacent pixel is divided. Thereby the area of one sub-pixel is made different from the area of another. This makes it possible to display more colors than in the conventional apparatus.

Figure 1:
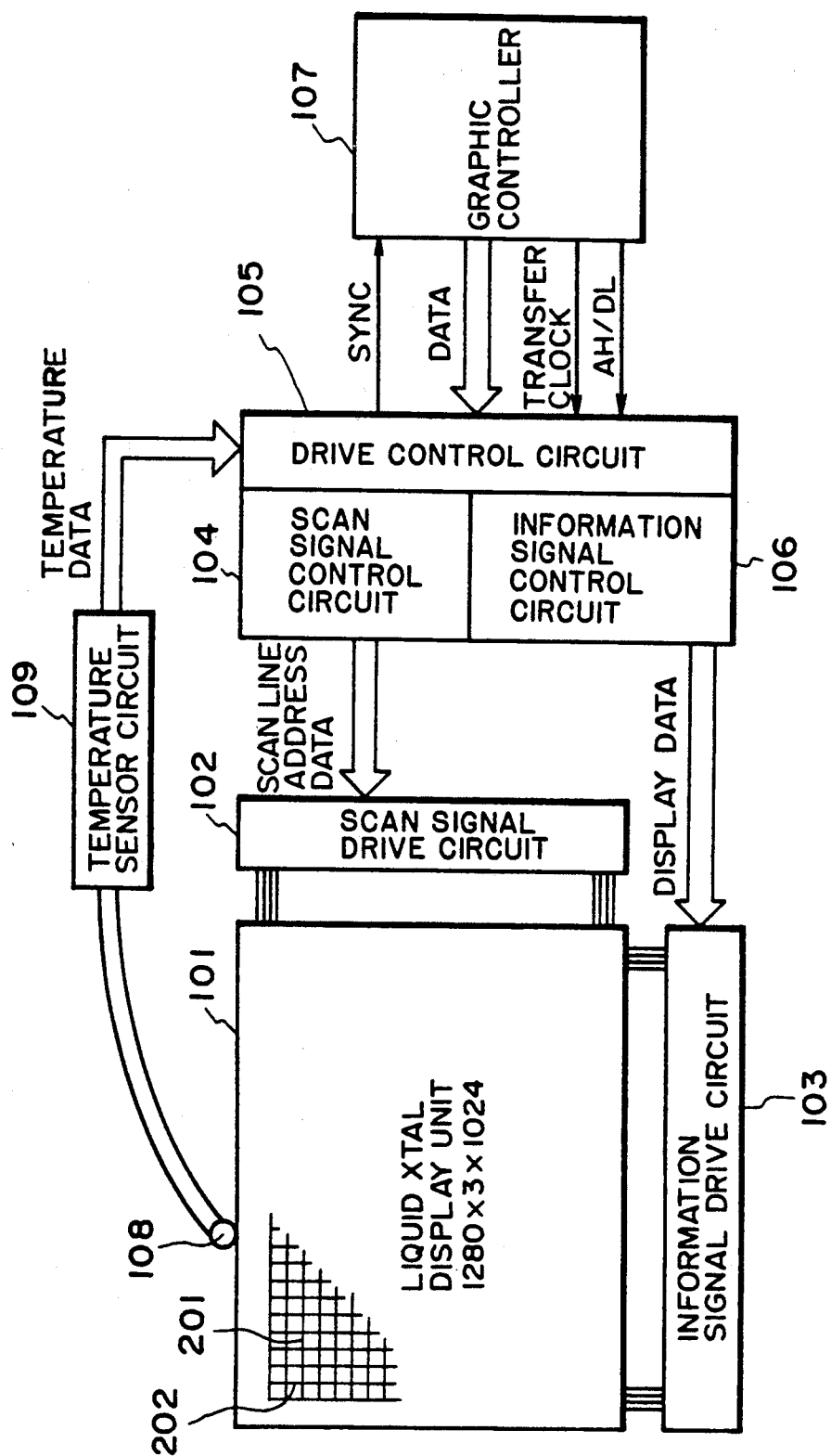
FIG. 1 is a schematic view of a first embodiment of the present invention.

FIG. 1 shows a liquid crystal display apparatus in accordance with the first embodiment of this invention. The display apparatus comprises a liquid crystal display device 101, a scan signal drive circuit 102, an information signal drive circuit 103, a scan signal control circuit 104, and a drive control circuit 105. The display apparatus further comprises an information signal control circuit 106, a thermistor 108 for measuring the temperature of the display device 101, and a temperature sensing circuit 109 for measuring the temperature of the display device 101 on the basis of an output from the thermistor 108. The display device 101 has a matrix electrode composed of scan electrodes 201 and information electrodes 202, both shown in detail in FIG. 2. The information signal drive circuit 103 applies an information signal to the liquid crystal through the information electrodes 202. The information signal includes a plurality of pulses, each having a control phase portion and an auxiliary phase portion. The scan signal drive circuit 102 applies a scan signal to the liquid crystal through the scan electrodes 201. The scan signal has phase pulses which compensate for at least one pulse in the auxiliary phase of the information signal. A ferroelectric liquid crystal is disposed between the scan electrodes 201 and the information electrodes 202. Numeral 107 denotes a graphic controller. Data is transmitted from the graphic controller 107 and input via the drive control circuit 105 to the scan signal control circuit 104 and the information signal control circuit 106. The data is converted into address data by the scan signal control circuit 104 and into display data by the information signal control circuit 106. The temperature of the display device 101 is input through the thermistor 108 to the temperature sensing circuit 109, and then input as temperature data to the scan signal control circuit 104 through the drive control circuit 105. The scan signal drive circuit 102 generates the scan signal in accordance with the address and temperature data and then applies it to the scan electrodes 201 of the display device 101. The information signal drive circuit 103 generates the information signal in accordance with the display data and then applies it to the information electrodes 202 of the display device 101.

Figure 4:
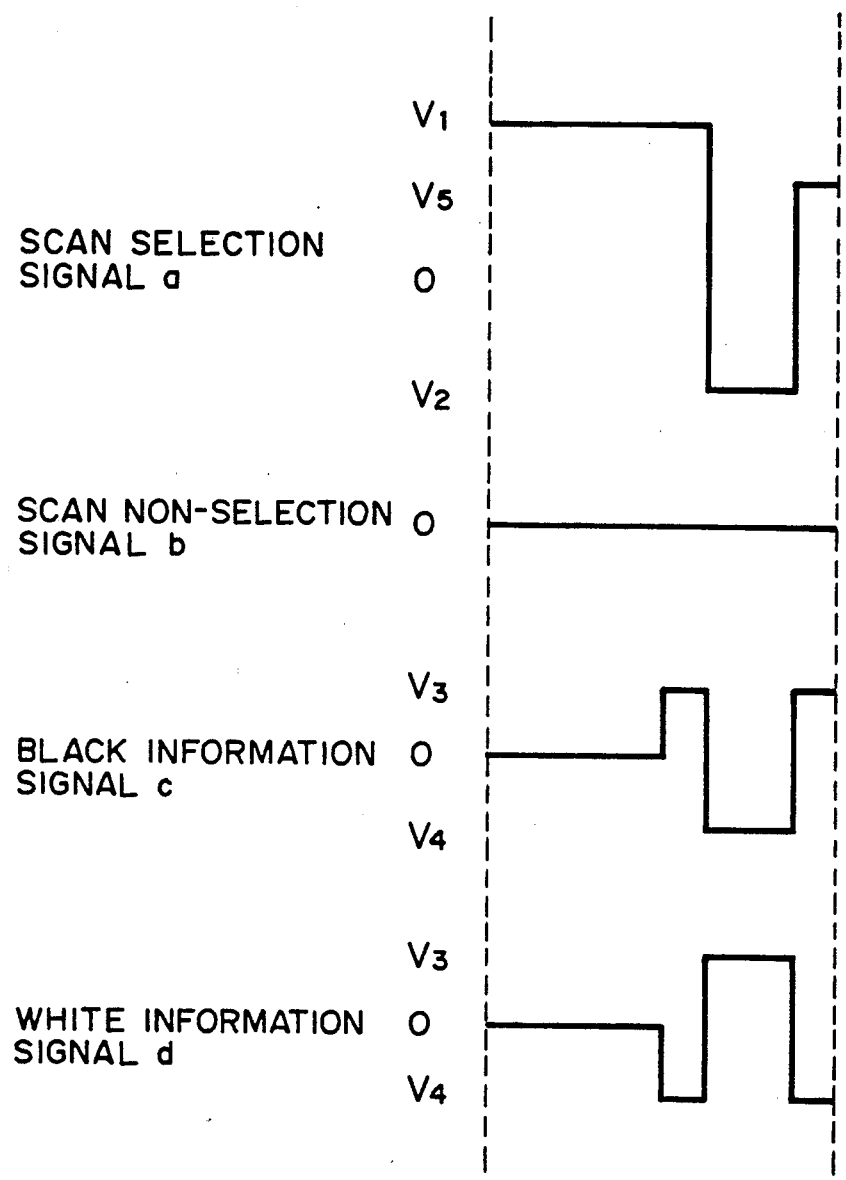
FIG. 4 is a waveform chart of drive signals used by the display apparatus shown in FIG. 1.
Figure 5:
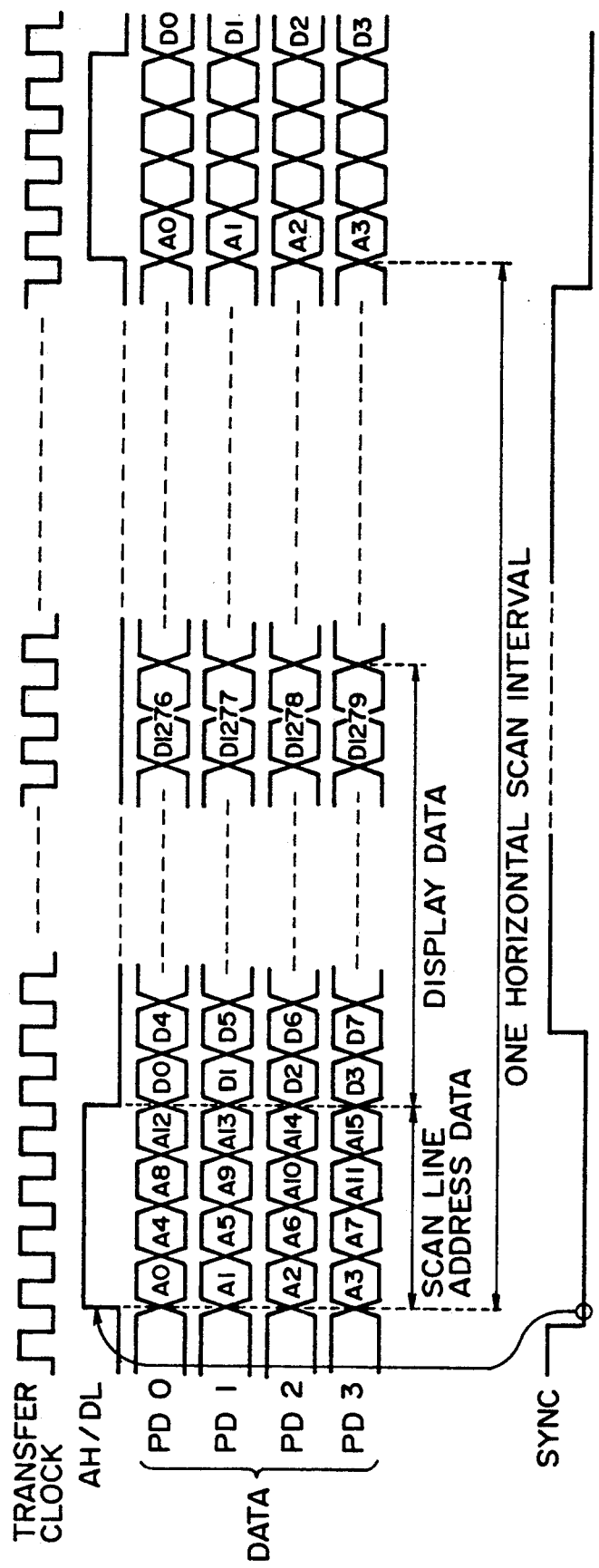
FIG. 5 is a timing chart showing when the display apparatus transmits the drive signals.

FIG. 4 shows the waveform of drive signals (scan and information signals) used by the display apparatus, and FIG. 5 is a timing chart showing when the display apparatus transmits the drive signals.

Figure 2:
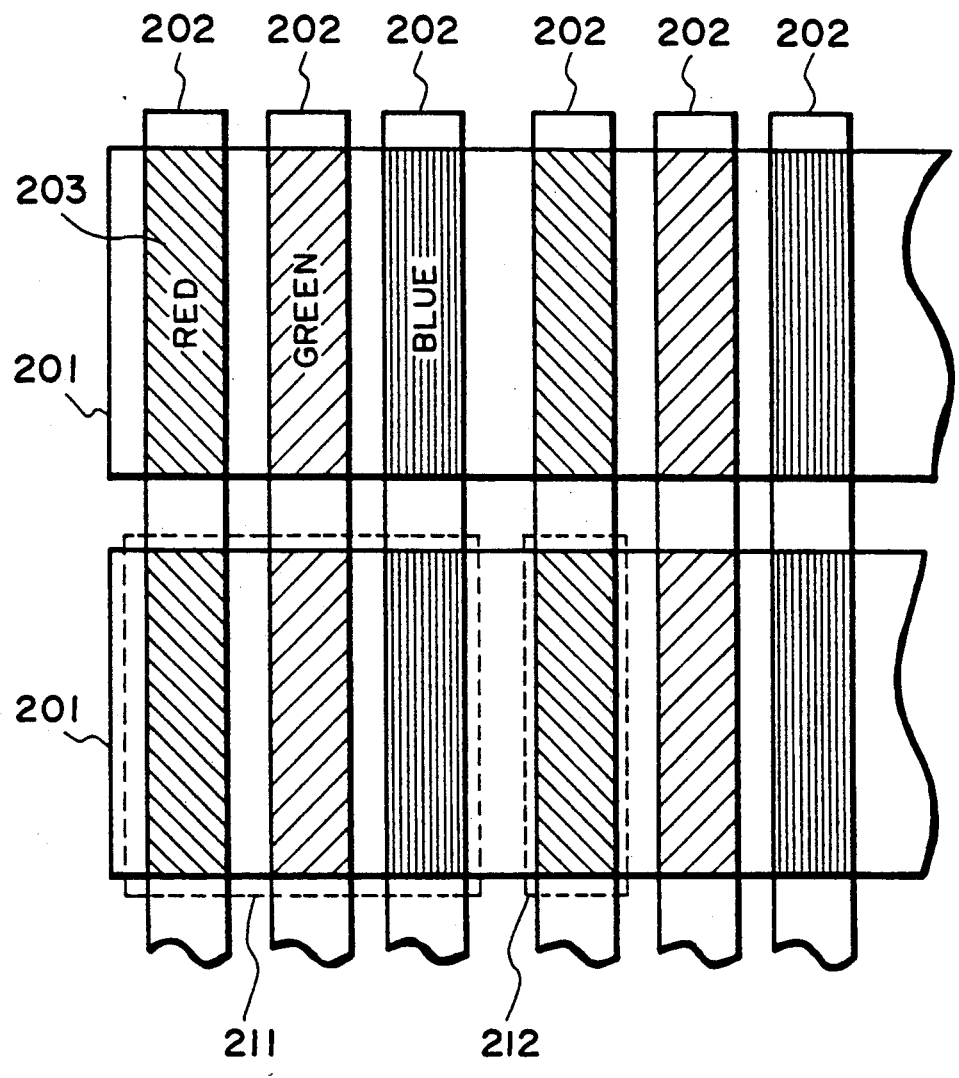
FIG. 2 is an enlarged view of a liquid crystal display apparatus shown in FIG. 1.

FIG. 2 shows in detail the liquid crystal display device 101. In FIG. 2, numeral 211 denotes a pixel, serving as a minimum display unit, formed where the scan electrode 201 intersects with the information electrodes 202. All pixels have the same area. A sub-pixels 212, serving as a minimum lighting unit, can be formed inside each pixel by dividing each information electrode 202. Red, green and blue filters 203 are disposed over the sub-pixels. Odd-numbered pixel along the scan electrode 201 are divided into red, green and blue in a ratio of 3/10:3/10:4/10, and even-numbered pixels are divided into red, green and blue in a ratio of 36/100:36/100:28/100. The liquid crystal display device 101 shown in FIG. 1 has 1024 scan electrodes 201 and 3840 (1280×3) information electrodes 202. It is provided with 1310720 (1280×1024) color pixels, each composed of three sub-pixels.

Figure 3:
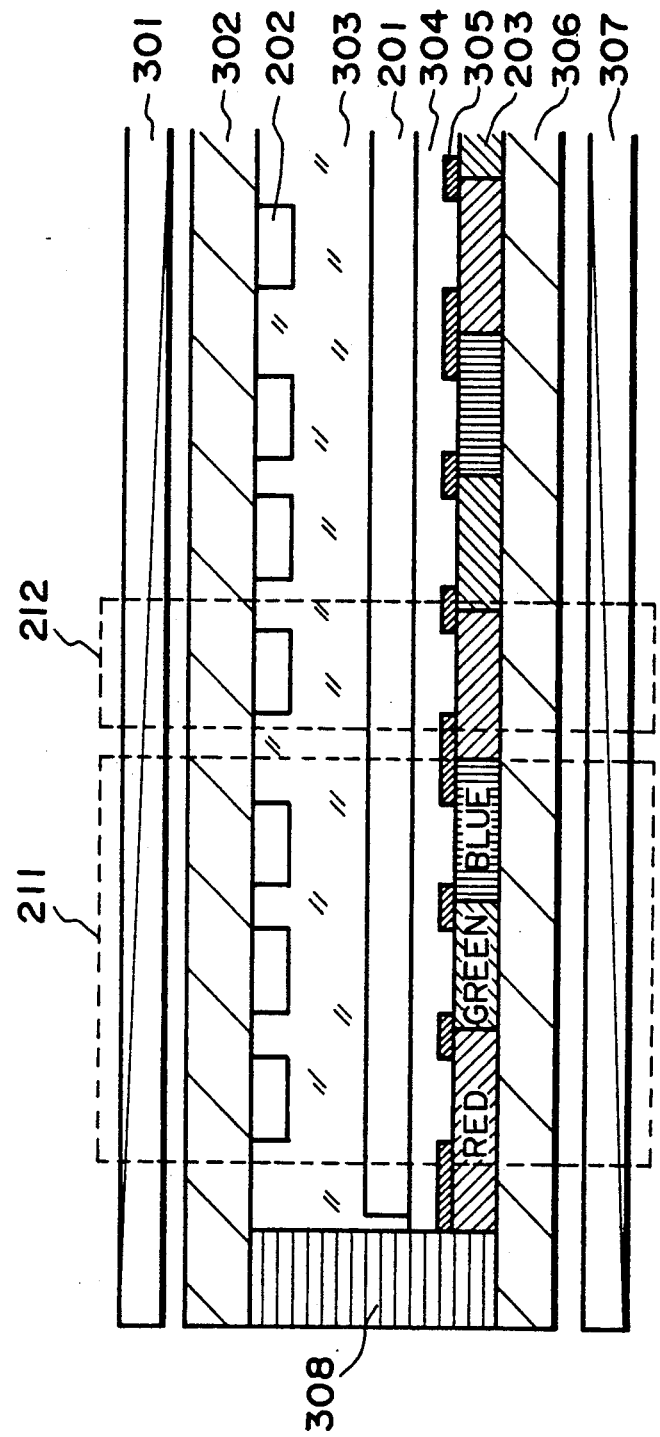
FIG. 3 is a sectional view of the liquid crystal display apparatus shown in FIG. 2.

FIG. 3 is a partial sectional view of the display device 101. Numeral 301 denotes an analyzer, and 307 a polarizer. They are disposed using crossed-Nicol. Numerals 302 and 306 denote glass substrates; 303, a ferroelectric liquid crystal; 304, a protecting film; 305, a light-intercepting metal; and 308, a spacer.

Table 1 shows colors that the display unit has when the graphic controller 107 transmits 1280×1024 pieces of information, that is, when one piece of information is transmitted to one pixel. To compare this embodiment with a conventional apparatus, comparison example 1. Table 2 shows colors displayed by the conventional apparatus in which each pixel is divided into red, green and blue in a ratio of 1/3:1/3:1/3. In this case, since each pixel serves as one display unit, each display unit has one sub-pixel on which red, green and blue filters are disposed. Eight colors can be displayed regardless of the ratio at which pixels are divided. The number of displayed colors in this embodiment agrees with that of the comparison example, both conforming to the following equation:

$$2^3 = 8.$$

In all Tables a white circuit (○) indicates that the color is lit, whereas a black circuit (●) indicates that the color is not lit.

TABLE 1

| | EMBODIMENT 1 (ONE PIECE OF INFORMATION FOR ONE PIXEL) | | | | | | | | | | |
|---|---|---|---|---|---|---|---|---|---|---|---|
| | ODD-NUMBERED PIXEL | | | | | | EVEN-NUMBERED PIXEL | | | | |
| | LIGHT STATUS | | | | | | LIGHT STATUS | | | | |
| DISPLAYED COLOR | RED (30%) | GREEN (30%) | BLUE (40%) | GRADATION (%) | | | RED (36%) | GREEN (36%) | BLUE (28%) | GRADATION (%) | | |
| | | | | RED | GREEN | BLUE | | | | RED | GREEN | BLUE |
| 1 | ● | ● | ● | 0 | 0 | 0 | ● | ● | ● | 0 | 0 | 0 |
| 2 | ○ | ● | ● | 30 | 0 | 0 | ○ | ● | ● | 36 | 0 | 0 |
| 3 | ● | ○ | ● | 0 | 30 | 0 | ● | ○ | ● | 0 | 36 | 0 |
| 4 | ○ | ○ | ● | 30 | 30 | 0 | ○ | ○ | ● | 36 | 36 | 0 |
| 5 | ● | ● | ○ | 0 | 0 | 40 | ● | ● | ○ | 0 | 0 | 28 |
| 6 | ○ | ● | ○ | 30 | 0 | 40 | ○ | ● | ○ | 36 | 0 | 28 |
| 7 | ● | ○ | ○ | 0 | 30 | 40 | ● | ○ | ○ | 0 | 36 | 28 |
| 8 | ○ | ○ | ○ | 30 | 30 | 40 | ○ | ○ | ○ | 36 | 36 | 28 |

TABLE 2

| | COMPARISON EXAMPLE 1 (ONE PIECE OF INFORMATION FOR ONE PIXEL) | | | | | |
|---|---|---|---|---|---|---|
| DISPLAYED COLOR | LIGHT STATUS | | | GRADATION (%) | | |
| | RED | GREEN | BLUE | RED | GREEN | BLUE |
| 1 | ● | ● | ● | 0 | 0 | 0 |
| 2 | ○ | ● | ● | 33.3 | 0 | 0 |
| 3 | ● | ○ | ● | 0 | 33.3 | 0 |
| 4 | ○ | ○ | ● | 33.3 | 33.3 | 0 |
| 5 | ● | ● | ○ | 0 | 0 | 33.3 |
| 6 | ○ | ● | ○ | 33.3 | 0 | 33.3 |
| 7 | ● | ○ | ○ | 0 | 33.3 | 33.3 |
| 8 | ○ | ○ | ○ | 33.3 | 33.3 | 33.3 |

When the graphic controller 107 transmits 640×1024 pieces of information, the number of displayed colors in this embodiment differs from that of the conventional example, the comparison example. In this case, two pixels serve as one display unit. Each display unit of this embodiment has two sub-pixels of different sizes on which red, green and blue filters are disposed, whereas each display unit of the conventional example has two sub-pixels of the same size, on which red, green and blue filters are disposed. Table 3 shows displayed colors of this embodiment, and Table 4 shows those of the conventional example.

TABLE 3

EMBODIMENT 1
(ONE PIECE OF INFORMATION FOR TWO PIXELS)

| DISPLAYED COLOR | LIGHT STATUS | | | | | | GRADATION (%) | | |
|---|---|---|---|---|---|---|---|---|---|
| | ODD-NUMBERED PIXEL | | | EVEN-NUMBERED PIXEL | | | | | |
| | RED (15%) | GREEN (15%) | BLUE (20%) | RED (18%) | GREEN (18%) | BLUE (14%) | RED | GREEN | BLUE |
| 1  | ● | ● | ● | ● | ● | ● | 0  | 0  | 0  |
| 2  | ○ | ● | ● | ● | ● | ● | 15 | 0  | 0  |
| 3  | ● | ○ | ● | ● | ● | ● | 0  | 15 | 0  |
| 4  | ○ | ○ | ● | ● | ● | ● | 15 | 15 | 0  |
| 5  | ● | ● | ○ | ● | ● | ● | 0  | 0  | 20 |
| 6  | ○ | ● | ○ | ● | ● | ● | 15 | 0  | 20 |
| 7  | ● | ○ | ○ | ● | ● | ● | 0  | 15 | 20 |
| 8  | ○ | ○ | ○ | ● | ● | ● | 15 | 15 | 15 |
| 9  | ● | ● | ● | ○ | ● | ● | 18 | 0  | 0  |
| 10 | ○ | ● | ● | ○ | ● | ● | 33 | 0  | 0  |
| 11 | ● | ○ | ● | ○ | ● | ● | 18 | 15 | 0  |
| 12 | ○ | ○ | ● | ○ | ● | ● | 33 | 15 | 0  |
| 13 | ● | ● | ○ | ○ | ● | ● | 18 | 0  | 20 |
| 14 | ○ | ● | ○ | ○ | ● | ● | 33 | 0  | 20 |
| 15 | ● | ○ | ○ | ○ | ● | ● | 18 | 15 | 20 |
| 16 | ○ | ○ | ○ | ○ | ● | ● | 33 | 15 | 20 |
| 17 | ● | ● | ● | ● | ○ | ● | 0  | 18 | 0  |
| 18 | ○ | ● | ● | ● | ○ | ● | 15 | 18 | 0  |
| 19 | ● | ○ | ● | ● | ○ | ● | 0  | 33 | 0  |
| 20 | ○ | ○ | ● | ● | ○ | ● | 15 | 33 | 0  |
| 21 | ● | ● | ○ | ● | ○ | ● | 0  | 18 | 20 |
| 22 | ○ | ● | ○ | ● | ○ | ● | 15 | 18 | 20 |
| 23 | ● | ○ | ○ | ● | ○ | ● | 0  | 33 | 20 |
| 24 | ○ | ○ | ○ | ● | ○ | ● | 15 | 33 | 20 |
| 25 | ● | ● | ● | ○ | ○ | ● | 18 | 18 | 0  |
| 26 | ○ | ● | ● | ○ | ○ | ● | 33 | 18 | 0  |
| 27 | ● | ○ | ● | ○ | ○ | ● | 18 | 33 | 0  |
| 28 | ○ | ○ | ● | ○ | ○ | ● | 33 | 33 | 0  |
| 29 | ● | ● | ○ | ○ | ○ | ● | 18 | 18 | 20 |
| 30 | ○ | ● | ○ | ○ | ○ | ● | 33 | 18 | 20 |
| 31 | ● | ○ | ○ | ○ | ○ | ● | 18 | 33 | 20 |
| 32 | ○ | ○ | ○ | ○ | ○ | ● | 33 | 33 | 20 |
| 33 | ● | ● | ● | ● | ● | ○ | 0  | 0  | 14 |
| 34 | ○ | ● | ● | ● | ● | ○ | 15 | 0  | 14 |
| 35 | ● | ○ | ● | ● | ● | ○ | 0  | 15 | 14 |
| 36 | ○ | ○ | ● | ● | ● | ○ | 15 | 15 | 14 |
| 37 | ● | ● | ○ | ● | ● | ○ | 0  | 0  | 34 |
| 38 | ○ | ● | ○ | ● | ● | ○ | 15 | 0  | 34 |
| 39 | ● | ○ | ○ | ● | ● | ○ | 0  | 15 | 34 |
| 40 | ○ | ○ | ○ | ● | ● | ○ | 15 | 15 | 34 |
| 41 | ● | ● | ● | ○ | ● | ○ | 18 | 0  | 14 |
| 42 | ○ | ● | ● | ○ | ● | ○ | 33 | 0  | 14 |
| 43 | ● | ○ | ● | ○ | ● | ○ | 18 | 15 | 14 |
| 44 | ○ | ○ | ● | ○ | ● | ○ | 33 | 15 | 14 |
| 45 | ● | ● | ○ | ○ | ● | ○ | 18 | 0  | 34 |
| 46 | ○ | ● | ○ | ○ | ● | ○ | 33 | 0  | 34 |
| 47 | ● | ○ | ○ | ○ | ● | ○ | 18 | 15 | 34 |
| 48 | ○ | ○ | ○ | ○ | ● | ○ | 33 | 15 | 34 |
| 49 | ● | ● | ● | ● | ○ | ○ | 0  | 18 | 14 |
| 50 | ○ | ● | ● | ● | ○ | ○ | 15 | 18 | 14 |
| 51 | ● | ○ | ● | ● | ○ | ○ | 0  | 33 | 14 |
| 52 | ○ | ○ | ● | ● | ○ | ○ | 15 | 33 | 14 |
| 53 | ● | ● | ○ | ● | ○ | ○ | 0  | 0  | 34 |
| 54 | ○ | ● | ○ | ● | ○ | ○ | 15 | 0  | 34 |
| 55 | ● | ○ | ○ | ● | ○ | ○ | 0  | 33 | 34 |
| 56 | ○ | ○ | ○ | ● | ○ | ○ | 15 | 33 | 34 |
| 57 | ● | ● | ● | ○ | ○ | ○ | 18 | 18 | 14 |
| 58 | ○ | ● | ● | ○ | ○ | ○ | 33 | 18 | 14 |
| 59 | ● | ○ | ● | ○ | ○ | ○ | 18 | 33 | 14 |
| 60 | ○ | ○ | ● | ○ | ○ | ○ | 33 | 33 | 14 |
| 61 | ● | ● | ○ | ○ | ○ | ○ | 18 | 18 | 34 |
| 62 | ○ | ● | ○ | ○ | ○ | ○ | 33 | 18 | 34 |
| 63 | ● | ○ | ○ | ○ | ○ | ○ | 18 | 33 | 34 |
| 64 | ○ | ○ | ○ | ○ | ○ | ○ | 33 | 33 | 34 |

TABLE 4

COMPARISON EXAMPLE 1
(ONE PIECE OF INFORMATION FOR TWO PIXELS)

| DISPLAYED COLOR | ODD-NUMBERED PIXEL | | | EVEN-NUMBERED PIXEL | | | GRADATION (%) | | |
|---|---|---|---|---|---|---|---|---|---|
| | RED (16.7%) | GREEN (16.7%) | BLUE (16.7%) | RED (16.7%) | GREEN (16.7%) | BLUE (16.7%) | RED | GREEN | BLUE |
| 1 | • | • | • | • | • | • | 0 | 0 | 0 |
| 2 | ○ | • | • | • | • | • | 16.7 | 0 | 0 |
| 3 | • | ○ | • | • | • | • | 0 | 16.7 | 0 |
| 4 | ○ | ○ | • | • | • | • | 16.7 | 16.7 | 0 |
| 5 | • | • | ○ | • | • | • | 0 | 0 | 16.7 |
| 6 | ○ | • | ○ | • | • | • | 16.7 | 0 | 16.7 |
| 7 | • | ○ | ○ | • | • | • | 0 | 16.7 | 16.7 |
| 8 | ○ | ○ | ○ | • | • | • | 16.7 | 16.7 | 16.7 |
| 9 | ○ | • | • | ○ | • | • | 33.3 | 0 | 0 |
| 10 | ○ | ○ | • | ○ | • | • | 33.3 | 16.7 | 0 |
| 11 | ○ | • | ○ | ○ | • | • | 33.3 | 0 | 16.7 |
| 12 | ○ | ○ | ○ | ○ | • | • | 33.3 | 16.7 | 16.7 |
| 13 | • | ○ | • | • | ○ | • | 0 | 33.3 | 0 |
| 14 | ○ | ○ | • | • | ○ | • | 16.7 | 33.3 | 0 |
| 15 | • | ○ | ○ | • | ○ | • | 0 | 33.3 | 16.7 |
| 16 | ○ | ○ | ○ | • | ○ | • | 16.7 | 33.3 | 16.7 |
| 17 | ○ | ○ | • | ○ | ○ | • | 33.3 | 33.3 | 0 |
| 18 | ○ | ○ | ○ | ○ | ○ | • | 33.3 | 33.3 | 16.7 |
| 19 | • | • | ○ | • | • | ○ | 0 | 0 | 33.3 |
| 20 | ○ | • | ○ | • | • | ○ | 16.7 | 0 | 33.3 |
| 21 | • | ○ | ○ | • | • | ○ | 0 | 16.7 | 33.3 |
| 22 | ○ | ○ | ○ | • | • | ○ | 16.7 | 16.7 | 33.3 |
| 23 | ○ | • | ○ | ○ | • | ○ | 33.3 | 0 | 33.3 |
| 24 | ○ | ○ | ○ | ○ | • | ○ | 33.3 | 16.7 | 33.3 |
| 25 | • | ○ | ○ | • | ○ | ○ | 0 | 33.3 | 33.3 |
| 26 | ○ | ○ | ○ | • | ○ | ○ | 16.7 | 33.3 | 33.3 |
| 27 | ○ | ○ | ○ | ○ | ○ | ○ | 33.3 | 33.3 | 33.3 |

As seen from Tables 3 and 4, this embodiment is capable of displaying 64 colors compared with 27 colors of the conventional example. The number of displayed colors of this invention is 64, which conforms to the following equation:

$$2^6 = 64$$

In general, the closer the area ratio of sub-pixels in one pixel to that of sub-pixels in an adjacent pixel, the more consistent display is when finely gradated images are displayed and one pixel serves as a display unit. However, displaying gradation is not smooth when non-finely gradated images are displayed and a plurality of pixels serve as a display unit. It is therefore necessary to determine the area of each sub-pixel and the ratio of dividing it into areas when image quality is considered and both finely gradated and non-finely gradated images are displayed.

Embodiment 2 and Comparison Example 2

A description will now be given of the second embodiment of this invention, in which the area of one pixel is made different from that of an adjacent pixel, and the area of one sub-pixel is made different from that of another. It is thus possible to display more gradations than in the conventional display apparatus.

Figure 6:
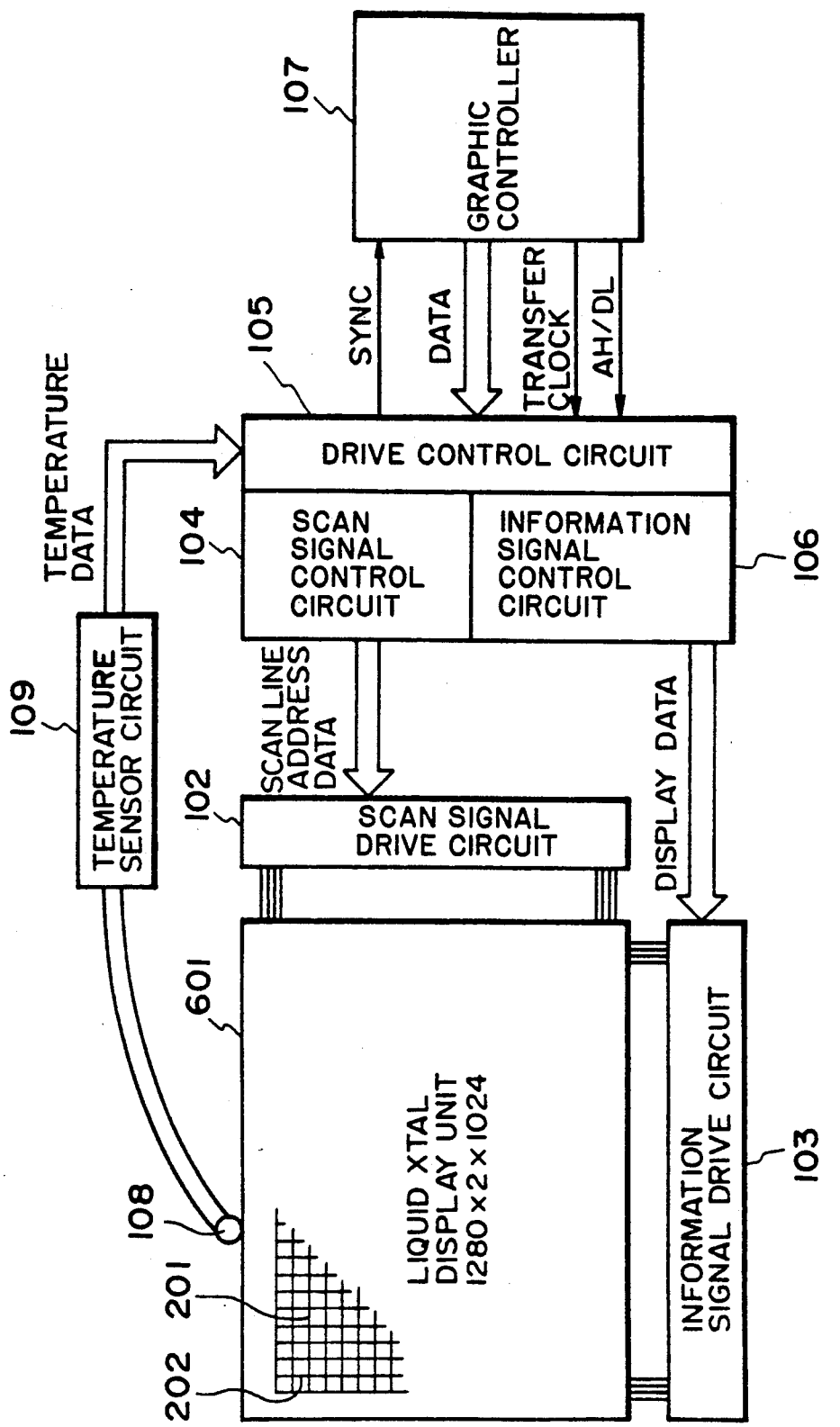
FIG. 6 is a schematic view of a second embodiment of this invention.

FIG. 6 is a schematic view of the second embodiment of this invention. It is the same as the first embodiment except for a liquid crystal display device 601.

Figure 7:
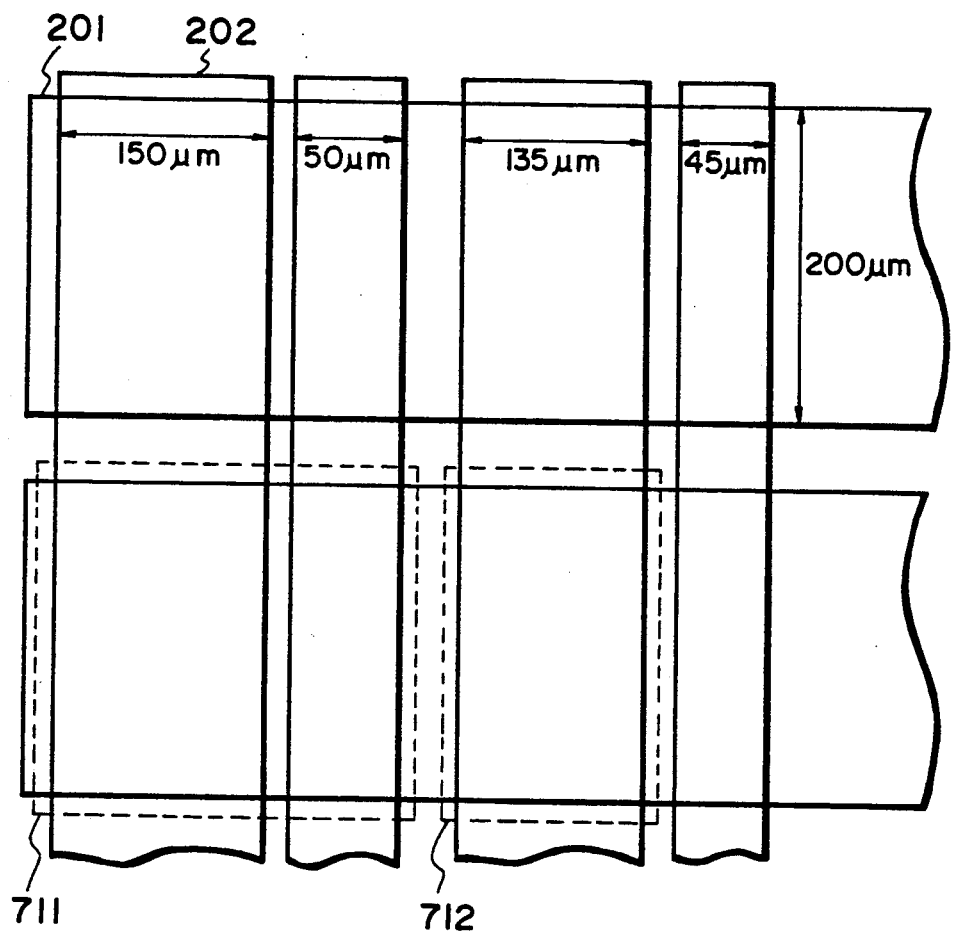
FIG. 7 is an enlarged view of a liquid crystal display apparatus shown in FIG. 6.

FIG. 7 is an enlarged view of the liquid crystal display device 601. Numeral 711 denotes a pixel, serving as a minimum display unit, formed where the scan electrode 201 intersects with the information electrodes 202. Numeral 712 denotes a sub-pixel formed by dividing the information electrode 202 in a ratio of 3:1. In this embodiment, even-numbered pixels along the scan electrode 201 have 90% area with respect to odd-numbered pixels. The liquid crystal display device 601 has 1024 scan electrodes 711, 2560 (1280×2) information electrodes 712 and 1310720 (1280×1024) pixels, each composed of two sub-pixels.

Figure 8:
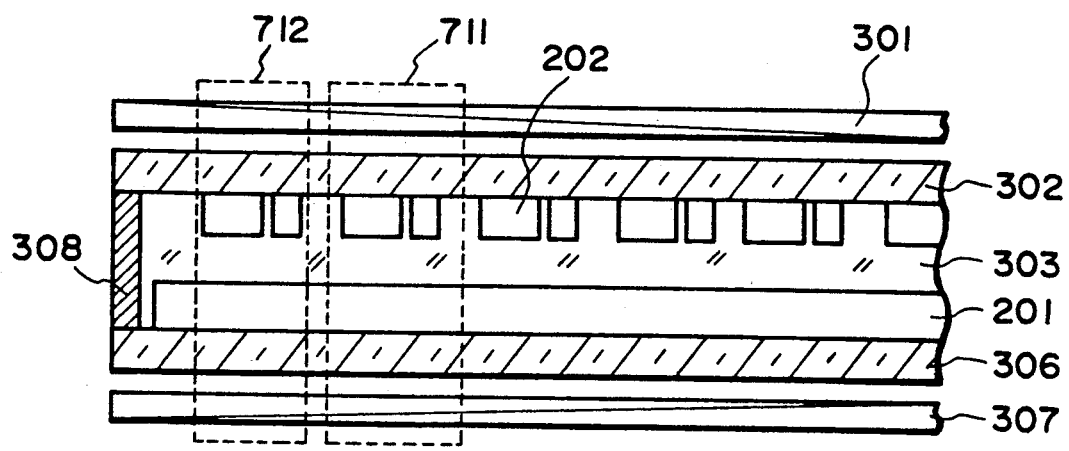
FIG. 8 is a sectional view of the liquid crystal display apparatus shown in FIG. 7.

FIG. 8 is a partial sectional view of the liquid crystal display device 601. It is substantially the same as the liquid crystal display device of the first embodiment except that the color filter 203, the protecting film 304 and the light-intercepting metal 305 are not provided.

Table 5 shows colors that the display unit has when the graphic controller 107 transmits 1280×1024 pieces of information. For comparison purposes, Table 5 also shows colors displayed by a conventional apparatus (comparison example 2) in which all pixels have the same area. In such a case, this embodiment and the comparison example have each four gradations, thus conforming to the following equation:

$$2^2 = 4$$

TABLE 5

| | EMBODIMENT 2 | | | | | | COMPARISON EXAMPLE 2 | | |
|---|---|---|---|---|---|---|---|---|---|
| | ODD-NUMBERED PIXEL | | | EVEN-NUMBERED PIXEL | | | | | |
| DISPLAYED GRADATION | LIGHT STATUS | | GRADA-TION | LIGHT STATUS | | GRADA-TION | LIGHT STATUS | | GRADA-TION |
| | 75% | 25% | | 75% | 25% | | 75% | 25% | |
| 1 | • | • | 0 | • | • | 0 | • | • | 0 |

TABLE 5-continued

| DISPLAYED GRADATION | EMBODIMENT 2 ||||||  COMPARISON EXAMPLE 2 |||
|---|---|---|---|---|---|---|---|---|---|
| | ODD-NUMBERED PIXEL ||| EVEN-NUMBERED PIXEL ||| |||
| | LIGHT STATUS || GRADA-TION | LIGHT STATUS || GRADA-TION | LIGHT STATUS || GRADA-TION |
| | 75% | 25% | | 75% | 25% | | 75% | 25% | |
| 2 | ● | ○ | 25 | ● | ○ | 25 | ● | ○ | 25 |
| 3 | ○ | ● | 75 | ○ | ● | 75 | ○ | ● | 75 |
| 4 | ○ | ○ | 100 | ○ | ○ | 100 | ○ | ○ | 100 |

When the graphic controller 107 transmits 640×1024 pieces of information, two pixels serve as one display unit. Each display unit has four sub-pixels of different areas, whereas each display unit of the conventional example, comparison example 2, has two sub-pixels of the same area. Table 6 shows displayed colors of this embodiment and the conventional example.

TABLE 6

| DIS-PLAYED GRADA-TION | EMBODIMENT 2 |||||  COMPARISON EXAMPLE 2 |||||
|---|---|---|---|---|---|---|---|---|---|---|
| | LIGHT STATUS ||||| |||||
| | ODD-NUMBERED PIXEL || EVEN-NUMBERED PIXEL || GRADA-TION | LIGHT STATUS |||| GRADA-TION |
| | 39.5% | 13.2% | 35.5% | 11.8% | | 37.5% | 12.5% | 37.5% | 12.5% | |
| 1 | ● | ● | ● | ● | 0 | ● | ● | ● | ● | 0 |
| 2 | ● | ● | ● | ○ | 11.8 | ● | ● | ● | ○ | 12.5 |
| 3 | ● | ○ | ● | ● | 13.2 | ● | ○ | ● | ○ | 25 |
| 4 | ● | ○ | ● | ○ | 25 | ● | ● | ○ | ● | 37.5 |
| 5 | ● | ● | ○ | ● | 35.5 | ● | ● | ○ | ○ | 50 |
| 6 | ○ | ● | ● | ● | 39.5 | ● | ○ | ○ | ○ | 62.5 |
| 7 | ● | ● | ○ | ○ | 47.3 | ○ | ● | ○ | ● | 75 |
| 8 | ● | ○ | ○ | ● | 48.7 | ○ | ● | ○ | ○ | 87.5 |
| 9 | ○ | ● | ● | ○ | 51.3 | ○ | ○ | ○ | ○ | 100 |
| 10 | ○ | ○ | ● | ● | 52.7 | | | | | |
| 11 | ● | ○ | ○ | ○ | 60.5 | | | | | |
| 12 | ○ | ○ | ● | ○ | 64.5 | | | | | |
| 13 | ○ | ○ | ○ | ● | 75 | | | | | |
| 14 | ○ | ● | ○ | ○ | 86.8 | | | | | |
| 15 | ○ | ○ | ○ | ● | 88.2 | | | | | |
| 16 | ○ | ○ | ○ | ○ | 100 | | | | | |

As apparent from Table 6, the conventional example is capable of displaying 9 gradations, while this embodiment is capable of displaying 16 gradations, which conform to the following equation:

$$2^4 = 16$$

Embodiment 3 and Comparison Example 3

A description will now be given of the third embodiment of this invention, in which the area of one pixel is made different from that of an adjacent pixel. This makes the area of one sub-pixel different from that of another. It is thus possible to display more gradations than in the conventional display apparatus.

Figure 9:
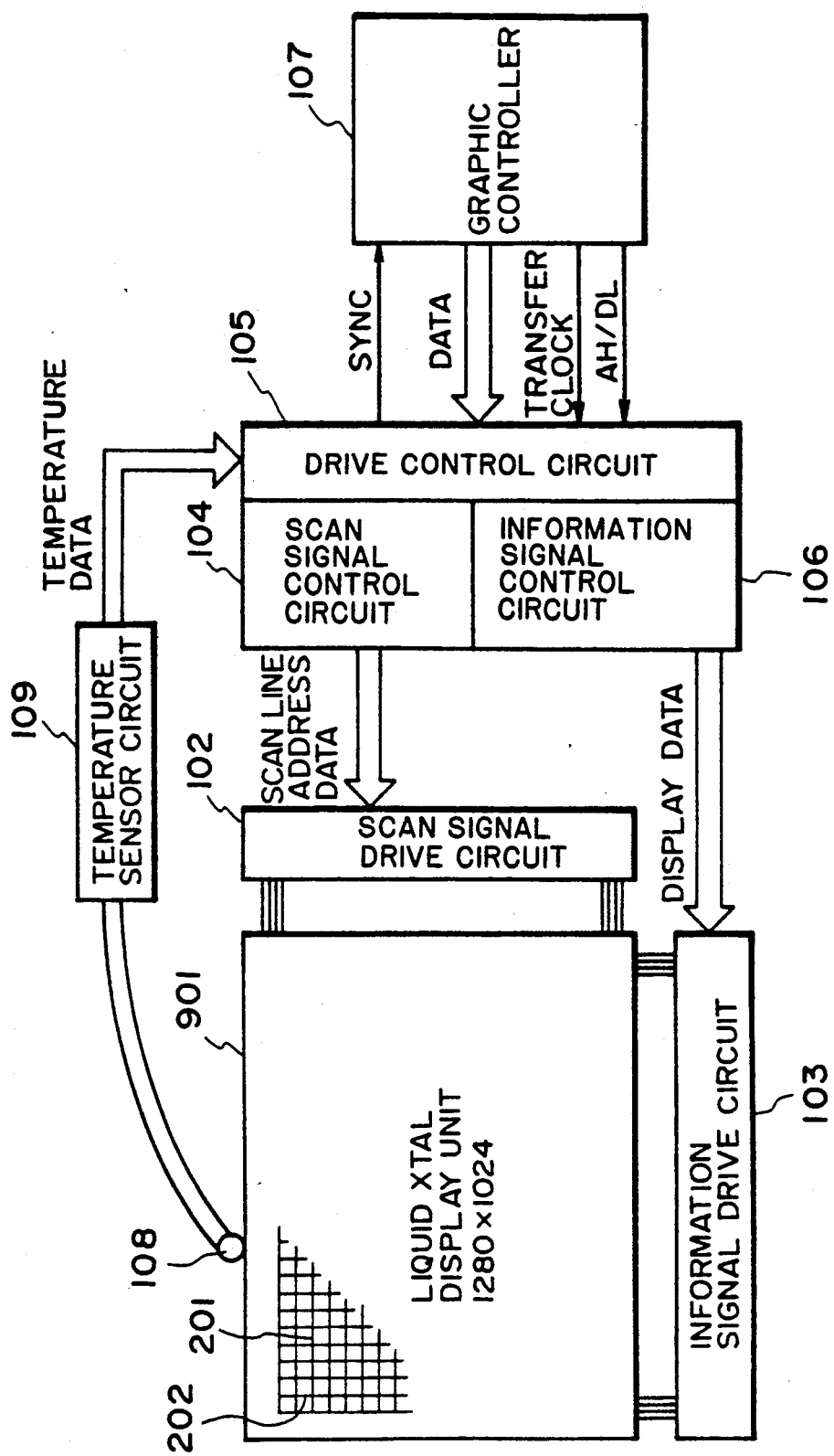
FIG. 9 is a schematic view of a third embodiment of this invention.

FIG. 9 is a schematic view of the third embodiment of this invention. It is the same as the first embodiment except for a liquid crystal display device 901.

Figure 10:
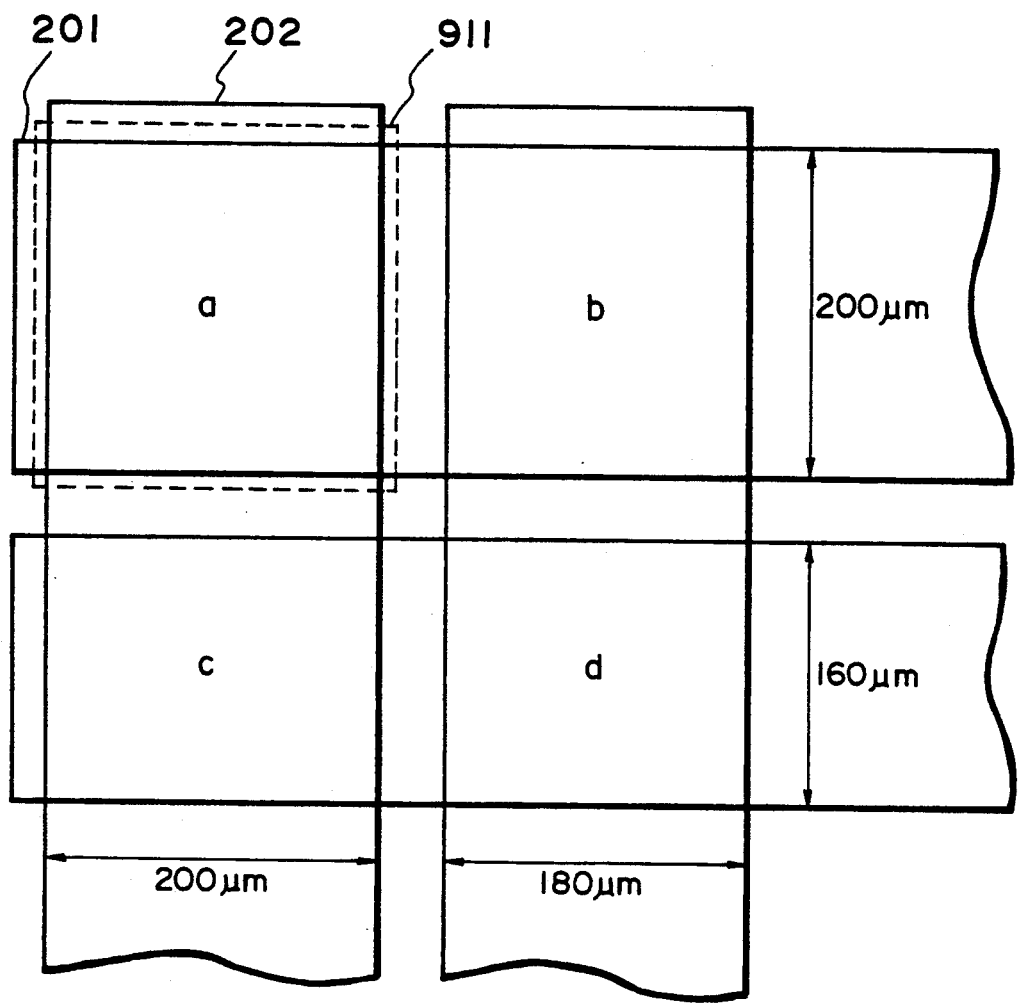
FIG. 10 is an enlarged view of a liquid crystal display apparatus shown in FIG. 9.

FIG. 10 is an enlarged view of the liquid crystal display device 901. In FIG. 10, numeral 911 denotes a pixel, serving as a minimum display unit, formed where the scan electrode 201 intersects with the information electrode 202. The pixel 911 is a sub-pixel serving as a minimum lighting unit. In this embodiment, odd-numbered pixels along the scan electrode 201 have 90% area with respect to even-numbered pixels. Odd-numbered pixels along the information electrode 202 have 80% area with respect to even-numbered pixels. In other words, the areas of four adjacent pixels are divided in a ratio of 100:90:80:72.

Figure 11:
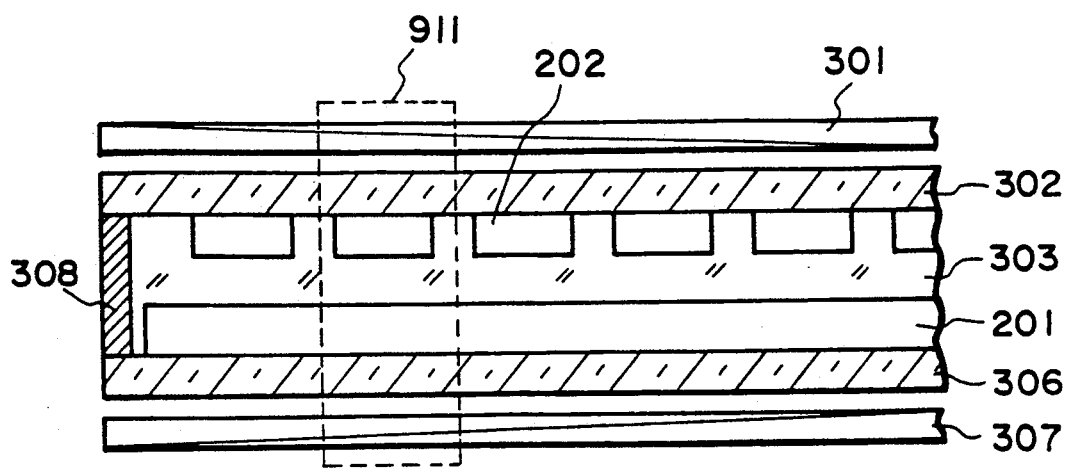
FIG. 11 is a sectional view of the liquid crystal display apparatus shown in FIG. 10.
Figure 12:
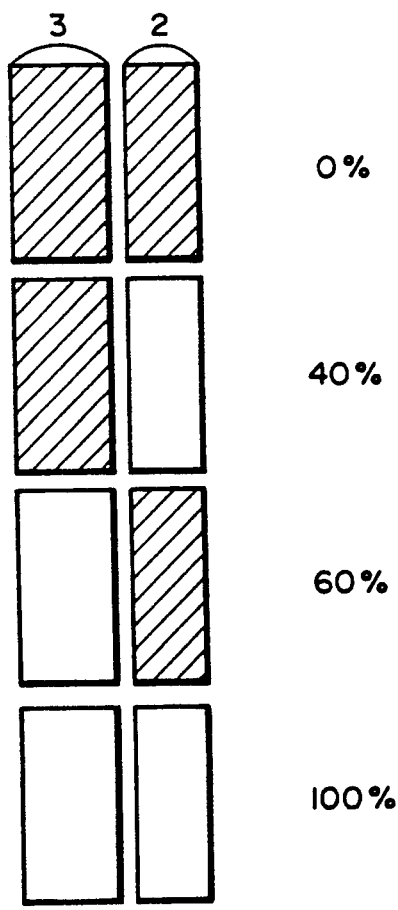
FIG. 12 is a view showing the conventional method of displaying gradations through the division of a pixel.

FIG. 11 is a partial sectional view of the liquid crystal display device 901. It is substantially the same as that of the second embodiment.

When the graphic controller 107 transmits 1280×1024 pieces of information, each pixel displays only binary values black and white in the same manner as in comparison example 3, conventional example, in which all pixels have the same area.

When the graphic controller 107 transmits 640×512 pieces of information, four pixels serve as one display unit having four sub-pixels of different areas. The display unit of the comparison example 3, conventional example, has four sub-pixels of the same area. Table 7 shows displayed colors of this embodiment and the conventional example.

TABLE 7

| DISPLAYED GRADATION | EMBODIMENT 3 ||||| COMPARISON EXAMPLE 3 |||||
|---|---|---|---|---|---|---|---|---|---|---|
| | LIGHT STATUS |||| GRADA-TION (%) | LIGHT STATUS |||| GRADA-TION (%) |
| | a 29.2% | b 26.3% | c 23.4% | d 21.1% | | 25% | 25% | 25% | 25% | |
| 1 | ● | ● | ● | ● | 0 | ● | ● | ● | ● | 0 |
| 2 | ● | ● | ● | ○ | 21.1 | ● | ● | ● | ○ | 25 |
| 3 | ● | ● | ○ | ● | 23.4 | ● | ● | ○ | ○ | 50 |
| 4 | ● | ○ | ● | ● | 26.3 | ● | ○ | ○ | ○ | 75 |
| 5 | ○ | ● | ● | ● | 29.2 | ○ | ○ | ○ | ○ | 100 |

TABLE 7-continued

| | EMBODIMENT 3 | | | | GRADATION (%) | COMPARISON EXAMPLE 3 | | | | GRADATION (%) |
|---|---|---|---|---|---|---|---|---|---|---|
| | LIGHT STATUS | | | | | LIGHT STATUS | | | | |
| DISPLAYED GRADATION | a 29.2% | b 26.3% | c 23.4% | d 21.1% | | 25% | 25% | 25% | 25% | |
| 6  | • | • | ○ | ○ | 44.5  | | | | | |
| 7  | • | ○ | • | ○ | 47.4  | | | | | |
| 8  | • | ○ | ○ | • | 49.7  | | | | | |
| 9  | ○ | • | • | ○ | 50.3  | | | | | |
| 10 | ○ | • | ○ | • | 52.6  | | | | | |
| 11 | ○ | ○ | • | • | 55.5  | | | | | |
| 12 | • | ○ | ○ | ○ | 70.8  | | | | | |
| 13 | ○ | • | ○ | ○ | 73.7  | | | | | |
| 14 | ○ | ○ | • | ○ | 76.6  | | | | | |
| 15 | ○ | ○ | ○ | • | 78.9  | | | | | |
| 16 | ○ | ○ | ○ | ○ | 100   | | | | | | where a, b, c and d in Table 7 correspond to sub-pixels a, b, c and d shown in FIG. 10.

As seen from Table 7, the conventional example is capable of displaying 5 gradations, whereas this embodiment is capable of displaying 16 gradations, which conform to the following equation:

$$2^2 = 16$$

As has been described above, the area of one sub-pixel in one pixel is different from that of another sub-pixel in an adjacent pixel. Therefore, this invention is capable of displaying more colors and gradations than the conventional display apparatus when a single piece of information is displayed using a plurality of pixels.

What is claimed is:

1. A display apparatus comprising pixels arranged along plural rows and columns, each pixel comprising a pair of opposed electrodes, wherein:
   said pixels further comprise an arrangement of plural sub-pixels with color filters of different colors wherein integral light quantities of the same color sub-pixels of adjacent pixels are different;
   said display apparatus further comprises means for selecting a first display operation in which a single pixel is displayed as one display unit, or a second display operation in which at least two adjacent pixels are combined to form one display unit.

2. A display apparatus according to claim 1, wherein the different colors of said color filters are red, green and blue.

3. A display apparatus according to claim 1, wherein said integral light quantity corresponds to an area of the sub-pixel.

4. A display apparatus according to claim 1, wherein a liquid crystal is arranged between said pair of electrodes.

5. A display apparatus according to claim 4, wherein said liquid crystal is a ferroelectric liquid crystal.

6. A display apparatus according to claim 1, wherein said adjacent pixels are among pixels arranged in one of said rows.

7. A display apparatus according to claim 1, wherein one of said pair of electrodes is a scanning electrode of a matrix electrode, and the other of said pair of electrodes in an information electrode of the matrix electrode.

8. A display apparatus comprising pixels arranged along plural rows and columns, said pixels comprising a pair of opposed electrodes, wherein:
   said pixels further comprise plural sub-pixels with different areas, wherein integral light quantities of adjacent pixels are different;
   said display apparatus further comprises means for selecting a first display operation in which a single pixel is displayed as one display unit, or a second display operation in which at least two adjacent pixels are combined to form one display unit.

9. A display apparatus according to claim 8, wherein said integral light quantity corresponds to an area of said sub-pixel.

10. A display apparatus according to claim 8, wherein a liquid crystal is arranged between said pair of electrodes.

11. A display apparatus according to claim 10, wherein said liquid crystal is ferroelectric liquid crystal.

12. A display apparatus according to claim 8, wherein said adjacent pixels are among pixels arranged in one of said rows.

13. A display apparatus according to claim 8, wherein one of said pair of electrodes is a scanning electrode of a matrix electrode, and the other of said pair of electrodes is an information electrode of the matrix electrode.

14. A display apparatus according to claim 8, wherein said sub-pixels in said pixel are provided with color filters of different colors.

* * * * *

UNITED STATES PATENT AND TRADEMARK OFFICE
CERTIFICATE OF CORRECTION

PATENT NO. : 5,317,437
DATED : May 31, 1994
INVENTOR(S) : KAZUNORI KATAKURA

It is certified that error appears in the above-identified patent and that said Letters Patent is hereby corrected as shown below:

COLUMN 1

Line 63, "ferro-electric" should read --ferroelectric--.

COLUMN 3

Line 26, "sub-pixels 212," should read --sub-pixel 212,--.
Line 60, "pixel" should read --pixels--.

COLUMN 4

Line 24, "circuit" should read --circle--.
Line 25, "circuit" should read --circle--.

COLUMN 11

Line 25, "$2^2=16$" should read --$2^4=16$--.

COLUMN 12

Line 24, "in" should read --is--.

Signed and Sealed this

Twenty-fifth Day of October, 1994

Attest:

BRUCE LEHMAN

Attesting Officer    Commissioner of Patents and Trademarks